Nov. 24, 1970   R. GOLDSMITH   3,542,633
ELECTRICALLY CONDUCTIVE ANTI-STICK CONVEYOR BELT
Filed Aug. 13, 1968   2 Sheets-Sheet 1

INVENTOR.
Robert Goldsmith
BY
Shenier & O'Connor
ATTORNEYS

Nov. 24, 1970  R. GOLDSMITH  3,542,633
ELECTRICALLY CONDUCTIVE ANTI-STICK CONVEYOR BELT
Filed Aug. 13, 1968  2 Sheets-Sheet 2
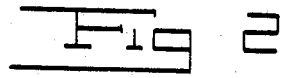
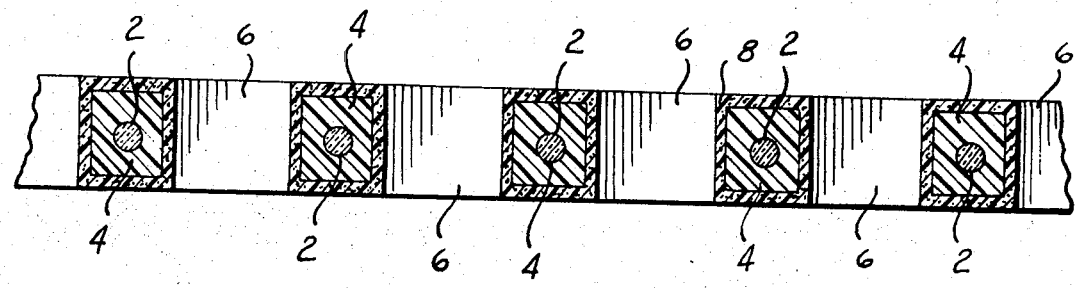
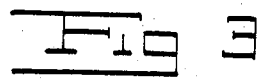
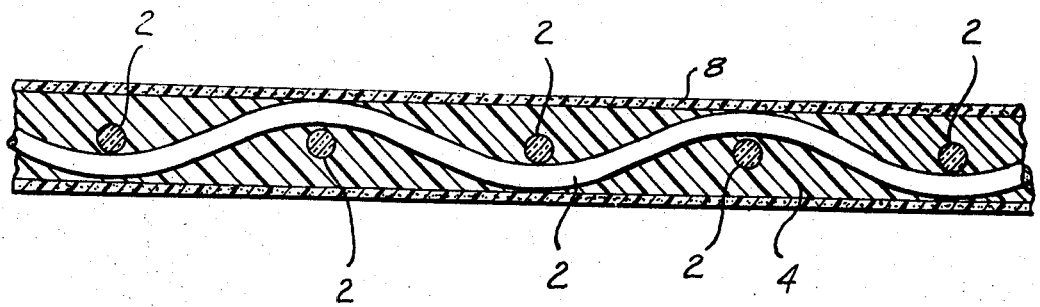
INVENTOR.
Robert Goldsmith
BY
Shenier & O'Connor
ATTORNEYS United States Patent Office
3,542,633
Patented Nov. 24, 1970

3,542,633
ELECTRICALLY CONDUCTIVE ANTISTICK CONVEYOR BELT
Robert Goldsmith, South Orange, N.J., assignor to General Plastics Corporation, Bloomfield, N.J., a corporation of New Jersey
Filed Aug. 13, 1968, Ser. No. 752,309
Int. Cl. B32b 5/28; B65g 15/34; H05f 3/00
U.S. Cl. 161—87                          7 Claims

ABSTRACT OF THE DISCLOSURE

A conveyor belt is formed of glass fiber cloth and impregnated with a fluorocarbon polymer to provide a foraminous belt having a nonstick surface. In order to prevent electrostatic charges from building up on the face of the belt and interfering with the articles being carried by it through process zones, the belt is provided with a thin coating of a fluorocarbon polymer resin through which there has been dispersed a finely divided conductive material. The thin conductive coating extends from the face of the belt through the interstices of its foraminous structure so that electrostatic charges may be conducted from the belt face to a grounded backing plate over which the back of the conveyor belt passes.

BACKGROUND OF THE INVENTION

My invention relates to an electrically conductive, antistick conveyor belt and more particularly to a glass fiber cloth belt which has been impregnated with a fluorocarbon polymers resin so as to provide an antistick foraminous structure which has been made electrically conductive by a coating of a fluorocarbon polymer resin rendered electrically conductive by dispersing therethrough a finely divided conductive material.

Tetrafluoroethylene may be polymerized to produce a fluorocarbon resin sold by E. I. Du Pont de Nemours and Co. under the trademark "Teflon." Similarly, chlorotrifluoroethylene may be polymerized to produce a fluorocarbon resin which is sold by M. W. Kellogg under the trademark "Kel-F". These fluorocarbon resins are not only chemically inert and have antistick properties, but they have excellent heat resistance, toughness and a remarkably low coefficient of friction.

Glass fibers may be woven into cloth of great strength which, when coated with a fluorocarbon resin, can be used as a conveyor belt. Such conveyor belts are particularly useful for conducting materials to be heat treated, such as elastomers and other polymers, through heat treating zones in which they are likely to become sticky and would thus adhere to conventional conveyor belts.

Unfortunately, fluorocarbon resins have excellent dielectric properties, so that the motion of the conveyor belt through the atmosphere generates electrostatic charges. If these build up, the products being conveyed into the heat treating zone will tend to repel each other and move about upon the conveyor belt, especially if such products are light, such as fibers.

SUMMARY OF THE INVENTION

One object of my invention is to provide an electrically conductive, antistick conveyor belt in which electrostatic charges may be conducted from the conveyor belt face to a grounded roll or backing plate over which the conveyor belt passes.

Another object of my invention is to provide a foraminous conveyor belt coated with a conductive fluorocarbon polymer.

Another object of my invention is to provide a foraminous conveyor belt coated with a conductive fluorocarbon resin extending from the face of the belt to its back.

Other and further objects of my invention will appear from the following description.

In general, my invention contemplates the provision of a foraminous belt preferably made of glass fiber cloth. However, the base material may be any flexible material which is sufficiently strong, which will withstand the temperature involved in sintering the Teflon, and which is provided with openings either inherently through its weave or formed with openings by perforating. The flexible substrate is coated with a fluorocarbon polymer resin to give it antistick properties. I then cover the base coating, which is non-conductive, with a conductive fluorocarbon coating so that electrostatic charges on the face of the belt can leak off through the conductive coating to the back of the belt to grounded backing plates or rollers.

BRIEF DESCRIPTION OF THE DRAWINGS

In the accompanying drawings which form part of the instant specification and which are to be read in conjunction therewith, and in which like reference numerals are used to indicate like parts in the various views:

FIGURE 2 is a sectional view taken along the line 2—2 of FIGURE 1.

FIGURE 3 is a sectional view taken along the line 3—3 of FIGURE 1.

DESCRIPTION OF THE PREFERRED EMBODIMENT

Figure 1:
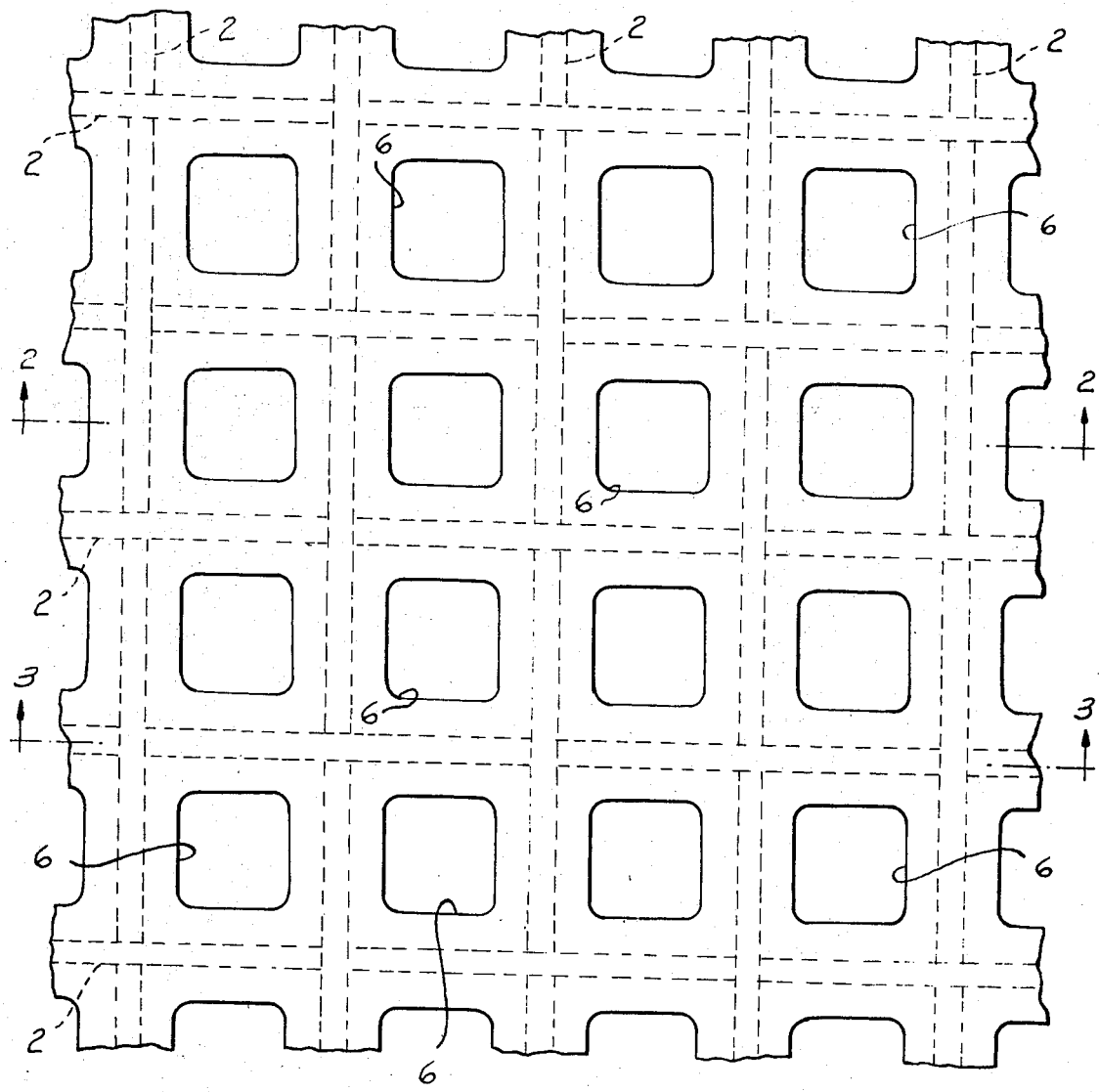
FIGURE 1 is a top plan view of a section of a conveyor belt showing one embodiment of my invention drawn on an enlarged scale.

More particularly referring now to the drawings, a base fabric comprising glass cloth woven of glass fiber yarns 2 is impregnated or coated with a fluorocarbon resin such as "Teflon" 4. Any appropriate concentration of "Teflon" may be employed. In general, a heavy concentration will produce a thicker coating, while a lighter concentration will produce a thinner coating or impregnation. The thickness of the coating employing 4 pounds of "Teflon" per gallon in a dispersion of "Teflon" will produce a coating which varies between .5 and 1.5 mils, depending upon the atmospheric conditions, temperature and rate of application. I have found a coating having a thickness of about 0.5 to 2 mils is satisfactory. One must be careful not to use a thickness sufficiently great to close the interstices 6 of the open weave cloth. While I prefer to use glass cloth, it is to be understood that any flexible material which will withstand the sintering or fusing temperature of the coating material may be used. If the material is sheet-like, openings may be provided by perforations.

The "Teflon" may be applied, for example, from a dispersion containing about 2 pounds of the resin per gallon in which the resin is maintained in dispersed condition by an agitator. The glass fiber cloth is dipped into the dispersion and air dried. It may be heated to slightly below the boiling point of water, which is the usual dispersing agent, to accelerate the evaporation of moisture. If desired, the water may be evaporated under sub-atmospheric pressure. After the cloth has been air dried, it is baked at a temperature above 630° F. The baking time will vary, depending on the condition of the baking oven. With a concentration of resin solids of about 2 pounds per gallon of water, a coating in the vicinity of ¼ mil is obtained. If a thicker coating is desired, the dipping, air-drying and baking steps are then repeated until the desired thickness of impregnating resin is reached, always being sure that the openings in the fiberglass cloth are not occluded. Preferably, for conveyor use, I prefer a coating of about 2 mils dry film thickness.

The conveyor belt which is fabricated of the "Teflon" coated glass cloth will vary in length and width, depending on the use to which it is to be put. A typical belt, for example, may have a width of about 5 ft. and may be about 140 ft. long. In one application in which the belt is intended to convey products being treated through an oven for heat treatment, it was attempted to solve the problem of air static charge by dispersing a conductive material, such as colloidal graphite or carbon black, through the dispersion before coating the glass fiber cloth. The result was unsuccessful. If insufficient graphite was added, the coating was not conductive. If sufficient graphite was added to make the coating conductive, the coating developed a multiplicity of tiny cracks which interfered with the antistick properties of the fluorocarbon resin. I solved the problem by coating the nonconductive "Teflon" coated base fabric with a light coating 8 of "Teflon" having dispersed therethrough a finely divided conductive material. For some reason which it not clear to me, the compound coated fabric having the light, conductive "Teflon" coating over a base, nonconductive "Teflon" coating retained the antistick properties of "Teflon" and did not develop cracks, even though sufficient graphite was added to make the overcoat conductive.

In carrying out my invention I use a dispersion containing 2 pounds of "Teflon" in 6.3 pounds of water. I then add 0.4 pound of colloidal graphite having a particle size between 0.5 and 8.0 microns. The average graphite particle size was 1.2 microns. The "Teflon" coated glass cloth was dipped in this dispersion, air-dried and then fused at a temperature between 710° F. and 750° F. for ten minutes. The conductive "Teflon" layer had a thickness of about 0.2 mil. It should be noted that while the non-conductive base resin coating must leave openings in the conveyor belt, the conductive layer coating may, if desired, completely plug the holes and thus present a smooth surface having no openings whatever. The conductive coating ensures a path from the face to the back of the belt through which electrical charges may be conducted to ground.

I have tried other conductive materials, such as finely divided aluminum, carbonyl iron and silver. For some reason unknown to me, finely divided carbon, and particularly graphite, produces the most satisfactory results. It will be noted that the ratio of resin solids to graphite, for example, was about 1.0 to 0.2.

With finely divided silver, the ratio of silver to resin solids was about 1 to 1. Neither aluminum nor carbonyl iron produced as good conductivity as did graphite, though it is to be understood that the invention may be practiced with other finely conductive materials within the ambit of my concept though not as satisfactorily as with graphite. The volume resistivity of my electrically conductive antistatic conveyor belt thus made was between about 1,000 and 30,000 ohms, which was sufficiently conductive to provide for the grounding of air static charges and the bleeding of them from the face of the conveyor belt.

It will be understood by those skilled in the art that if a higher conductivity is required, a higher percentage of the conductive ingredient can be added.

It will be seen that I have accomplished the objects of my invention. I have provided a conveyor belt which is electrically conductive and has an antistick surface so that products being processed carried by the conveyor belt will not be subject to air static charges owing to the fact that such may be bled to ground through a conductive coating. The problem which appeared when it was attempted to make the base coating sufficiently conductive of having the coating crack, was solved by the use of a two-phase coating of fluorocarbon resins. The first coating was nonconductive, but had great toughness, inertness, heat resistance and antistick properties. The second coating, while not as tough, was sufficiently antistick and yet possesses heat resistance and an additional property, not possessed by the base coat, namely electrical conductivity. The provision of a foraminous structure enabled the conductive coating to provide a path for the bleeding of electrostatic charges from the face of the belt to the back of the belt so that the back on being grounded, would free the face of the belt from electrostatic charges and conduct them away before a sufficiently high voltage was built up to jump the air gap between products lying side by side upon the conveyor belt.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A conveyor belt including in combination a flexible, foraminous substrate, an impregnating layer comprising a flourocarbon polymer resin and a second layer of a fluorocarbon polymer resin covering said first layer, said second layer having finely divided conductive particles dispersed therethorugh to render said second layer electrically conductive, said second layer extending through the substrate openings to provide a conductive path from the upper surface to the lower surface of the covered substrate.

2. A conveyor belt as in claim 1 in which the second layer is thinner than said first layer.

3. A conveyor belt as in claim 1 in which said fluorocarbon polymer resin is polytetrafluoroethylene.

4. A conveyor belt as in claim 1 in which said foraminous substrate is an open weave glass fiber cloth.

5. A conveyor belt as in calim 1 in which said finely divided conductive particles are graphite.

6. A conveyor belt as in claim 1 in which said finely divided conductive particles are graphite having an average particle size of 1.2 microns.

7. A conveyor belt as in claim 1 in which the ratio of resin solids to conductive particles in the second layer is about from 1.0:0.2 to 1.0:1.0.

References Cited
UNITED STATES PATENTS

| 3,473,087 | 10/1969 | Slayde | 317—2 |
| 3,235,772 | 2/1966 | Gurin | 317—2 |
| 3,168,426 | 2/1965 | Blackie | 161—189 X |
| 2,731,068 | 1/1956 | Richards. | |
| 2,449,972 | 9/1948 | Beach | 317—2 |
| 2,441,945 | 5/1948 | Frolich et al. | |
| 2,375,304 | 5/1945 | Kilduff | 317—2 |
| 2,084,523 | 6/1937 | Crawford. | |

ROBERT F. BURNETT, Primary Examiner

M. A. LITMAN, Assistant Examiner

U.S. Cl. X.R.

74—231; 161—93, 189; 198—193; 317—2